US011671991B2

(12) United States Patent
Rastogi et al.

(10) Patent No.: US 11,671,991 B2
(45) Date of Patent: Jun. 6, 2023

(54) METHOD AND SYSTEM FOR RESOURCE MANAGEMENT IN BLOCKCHAIN BASED IOT NETWORK

(71) Applicant: SAMSUNG ELECTRONICS CO., LTD., Suwon-si (KR)

(72) Inventors: Ishan Rastogi, Karnataka (IN); Rahul Rajendra Sonanis, Karnataka (IN); Umang Goel, Karnataka (IN); Siddharth Lal, Karnataka (IN); Yeonhyang Kim, Suwon-si (KR); Aloknath De, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/370,595

(22) Filed: Jul. 8, 2021

(65) Prior Publication Data

US 2022/0015087 A1 Jan. 13, 2022

(30) Foreign Application Priority Data

Jul. 13, 2020 (IN) .............................. 202041029707

(51) Int. Cl.
*H04L 67/12* (2022.01)
*H04W 72/51* (2023.01)
(Continued)

(52) U.S. Cl.
CPC ............. *H04W 72/51* (2023.01); *H04W 8/24* (2013.01); *H04W 24/02* (2013.01); *G16Y 30/10* (2020.01); *H04L 41/50* (2013.01); *H04L 67/12* (2013.01)

(58) Field of Classification Search
CPC ..... H04W 72/048; H04W 8/24; H04W 24/02; H04L 9/50; H04L 47/783; H04L 47/788; H04L 47/78; H04L 41/50
See application file for complete search history.

(56) References Cited

U.S. PATENT DOCUMENTS 6,246,879 B1 6/2001 Segura et al.
7,076,550 B1 7/2006 Noguchi et al.
(Continued)

FOREIGN PATENT DOCUMENTS

KR 10-2020-0003306 1/2020
WO 2019/126312 6/2019

OTHER PUBLICATIONS

International Search Report and Written Opinion dated Oct. 21, 2021 in corresponding International Application No. PCT/KR2021/008968.

*Primary Examiner* — Tom Y Chang
(74) *Attorney, Agent, or Firm* — Nixon & Vanderhye P.C.

(57) ABSTRACT

A method for resource management in a blockchain based IoT network comprising a plurality of IoT nodes connected with each other using block chain is disclosed. The method includes: receiving, by at least one first IoT node, at least one capability information of at least one second IoT node from the block chain based IoT network. The method may further include generating, by the at least one first IoT node, a smart contract to be executed between the at least one first IoT node and the at least one second IoT node based on the at least one capability information and at least one parameter associated with the at last one first IoT node and the at least one second IoT node and executing, by the at least one first IoT node, the smart contract with the at least one second IoT node.

20 Claims, 12 Drawing Sheets

(51) Int. Cl.
  *H04W 24/02*   (2009.01)
  *H04W 8/24*    (2009.01)
  *G16Y 30/10*       (2020.01)
  *H04L 41/50*       (2022.01)

(56) References Cited

U.S. PATENT DOCUMENTS

| | | |
|---|---|---|
| 10,243,748 B1 | 3/2019 | Callan et al. |
| 2017/0302663 A1 | 10/2017 | Nainar et al. |
| 2019/0260591 A1 | 8/2019 | Dechu et al. |
| 2020/0067708 A1 | 2/2020 | Subba |
| 2020/0160334 A1 | 5/2020 | Alba et al. |
| 2020/0409940 A1* | 12/2020 | Gu ................... G06F 16/2365 |
| 2020/0410445 A1* | 12/2020 | Blackburn ........... G06Q 50/165 |
| 2021/0191827 A1* | 6/2021 | Arumugam ......... G06F 11/2025 |
| 2021/0357461 A1* | 11/2021 | Xiao ................. G06F 16/2237 |
| 2021/0374741 A1* | 12/2021 | Wood .................... G06Q 40/03 |
| 2021/0399896 A1* | 12/2021 | Chen ....................... H04L 67/12 |
| 2022/0210160 A1* | 6/2022 | Opsenica ............. H04W 12/06 |

\* cited by examiner

METHOD AND SYSTEM FOR RESOURCE MANAGEMENT IN BLOCKCHAIN BASED IOT NETWORK

CROSS-REFERENCE TO RELATED APPLICATION

This application is based on and claims priority under 35 U.S.C. § 119 to Indian Complete Patent Application No. 202041029707, filed on Jul. 13, 2020, in the Indian Intellectual Property Office, the disclosure of which is incorporated by reference herein in its entirety.

BACKGROUND

Field

The disclosure relates to an internet of things (IoT) network, and for example to a method and system for resource management in a blockchain based internet of things (IoT) network.

Description of Related Art

Internet of things (IoT) network may refer, for example, to a network comprising of varied type of devices such as for example washing machines, refrigerators, sensors, mobiles, smart hubs, etc., which interact together to give a holistic experience to users.

Conventionally, IoT networks may be implemented as a cloud based architecture where most of device-to-device interactions happen through the cloud. The cloud acts as an adapter between the various devices, translating commands from a sender device's protocol to a receiver device's protocol.

The device-to-device interactions may be governed by device capabilities which are an abstract way to represent device state and functionalities. It can be similar to resource modeling in Open Connectivity Foundation (OCF) specifications, or capabilities in smart things. Therefore, the conventional methods require a dedicated connection of most of the devices to the cloud for seamless IoT experience. Further, device data which may include sensitive/personal data of the user needs to be transferred to the cloud and hence providing a possibility of compromise of user privacy.

Thus, it is desired to address the above mentioned disadvantages or other shortcomings or at least provide a useful alternative.

SUMMARY

Embodiments of the disclosure relate to wireless communication systems and, for example, to random access response and contention resolution.

Embodiments of the disclosure provide a method for resource management in a blockchain based internet of things (IoT) network comprising a plurality of IoT nodes connected with each other using block chain. According to an example embodiment, a method includes: receiving, by at least one first IoT node of the plurality of IoT nodes, at least one capability information of at least one second IoT node of the plurality of IoT nodes from the blockchain based IoT network. The at least one capability information is associated with the at least one second IoT node. Further, the method includes generating, by the at least one first IoT node, a smart contract to be executed between the at least one first IoT node and the at least one second IoT node based on the at least one capability information associated with the at least one second IoT node, and at least one parameter associated with the at last one first IoT node and the at least one second IoT node. The method includes: executing, by the at least one first IoT node, the smart contract with the at least one second IoT node; and communicating, by the at least one first IoT node, with the at least one second IoT node based on the execution.

In an embodiment, generating, by the at least one first IoT node, the smart contract to be executed between the at least one first IoT node and the at least one second IoT node includes: detecting, by the at least one first IoT node, whether the at least one capability information is a new capability of the at least one second IoT node and determining, by the at least one first IoT node, a level of match between the new capability of the at least one second IoT node and an existing capability of the at least one first IoT node based on the at least one parameter associated with the at last one first IoT node and the at least one second IoT node. Further, the method may include generating, by the at least one first IoT node, the smart contract to be executed based on the level of match.

In an embodiment, generating, by the at least one first IoT node, the smart contract to be executed between the at least one first IoT node and the at least one second IoT node includes: detecting, by the at least one first IoT node, that the at least one capability information corresponds to a change in at least one existing capability of the at least one second IoT node and determining, by the at least one first IoT node, a level of match between the change in the at least one existing capability of the at least one second IoT node and the existing capability of the at least one first IoT node based on the at least one parameter associated with the at last one first IoT node and the at least one second IoT node. Further, the method may include generating, by the at least one first IoT node, the smart contract to be executed based on the level of match.

In an embodiment, generating, by the at least one first IoT node, the smart contract to be executed between the at least one first IoT node and the at least one second IoT node includes: detecting, by the at least one first IoT node, that the at least one capability information corresponds to at least one failed capability of the at least one second IoT node and determining, by the at least one first IoT node, at least one alternate capability for the at least one failed capability of the at least one second IoT node in the IoT network. Further, the method may include: determining, by the at least one first IoT node, a level of match between the at least one alternate capability of the at least one second IoT node and the existing capability of the at least one first IoT node based on at least one parameter associated with the at last one first IoT node and the at least one second IoT node and re-generating, by the at least one first IoT node, the smart contract to be executed based on the level of match. Furthermore, the method may also include: notifying, by the at least one first IoT node, the at least one failed capability to the at least one second IoT node; and sending, by the at least one first IoT node, metadata associated with the at least one second IoT node with the at least one failed capability to a service provider.

In an embodiment, detecting, by the at least one first IoT node, that the at least one capability information corresponds to the at least one failed capability of the at least one second IoT node includes: executing, by the at least one first IoT node, a diagnostic script present in an existing smart contract with the at least one second IoT node; and detecting, by the at least one first IoT node, that the at least one capability information corresponds to the at least one failed capability of the at least one second IoT node based on the execution of the diagnostic script, wherein the diagnostic script includes one of: service provider determined and user determined.

In an embodiment, the at least one parameter includes a type of communication between the at least one first IoT node and the at least one second IoT node, a level of communication between the at least one first IoT node and the at least one second IoT node, a computing power of the at least one first IoT node, and a computing power of the at least one second IoT node.

In an embodiment, executing, by the at least one first IoT node, the smart contract with the at least one second IoT node includes: determining, by the at least one first IoT node, a sensitive data and non-sensitive data in the smart contract and splitting, by the at least one first IoT node, the smart contract into a first contract and a second contract, wherein the first contract comprises the sensitive data and the second contract comprises the non-sensitive data. Further, the method may include: executing, by the at least one first IoT node, the first contract; and offloading, by the at least one first IoT node, the second contract to be executed by the at least one first IoT device to at least one external entity.

In an embodiment, the generation of the smart contract may be based on a smart contract generation policy, wherein the smart contract generation policy includes one of: service provider determined and user determined.

Accordingly embodiments of the disclosure provide a first IoT node for resource management in a blockchain based internet of things (IoT) network comprising a plurality of IoT nodes connected with each other using block chain. The first IoT node includes: a memory, a communicator comprising communication circuitry and a processor. The processor is configured to receive at least one capability information of at least one second IoT node of the plurality of IoT nodes from the block chain based IoT network; generate a smart contract to be executed between the at least one first IoT node and the at least one second IoT node based on the at least one capability information associated with the at least one second IoT node and at least one parameter associated with the at last one first IoT node and the at least one second IoT node. The at least one capability information may be associated with the at least one second IoT node. Further, the processor is configured to execute the smart contract with the at least one second IoT node; and communicate, using the communicator, with the at least one second IoT node based on the execution.

Accordingly example embodiments herein disclose a system for resource management in a block chain based internet of things (IoT) network connected with each other using a block chain network. The system includes a plurality of IoT nodes connected with each other in the block chain based IoT network. The at least one first IoT node of the plurality of IoT nodes includes: a memory, a communicator comprising communication circuitry and a processor. The processor is configured to: receive at least one capability information of at least one second IoT node of the plurality of IoT nodes from the block chain based IoT network and generate a smart contract to be executed between the at least one first IoT node and the at least one second IoT node based on the at least one capability information associated with the at least one second IoT node and at least one parameter associated with the at last one first IoT node and the at least one second IoT node. The at least one capability information may be associated with the at least one second IoT node.

Further, the processor may be configured to: execute the smart contract with the at least one second IoT node; and communicate, using the communicator, with the at least one second IoT node based on the execution.

These and other aspects of the various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the various example embodiments herein without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
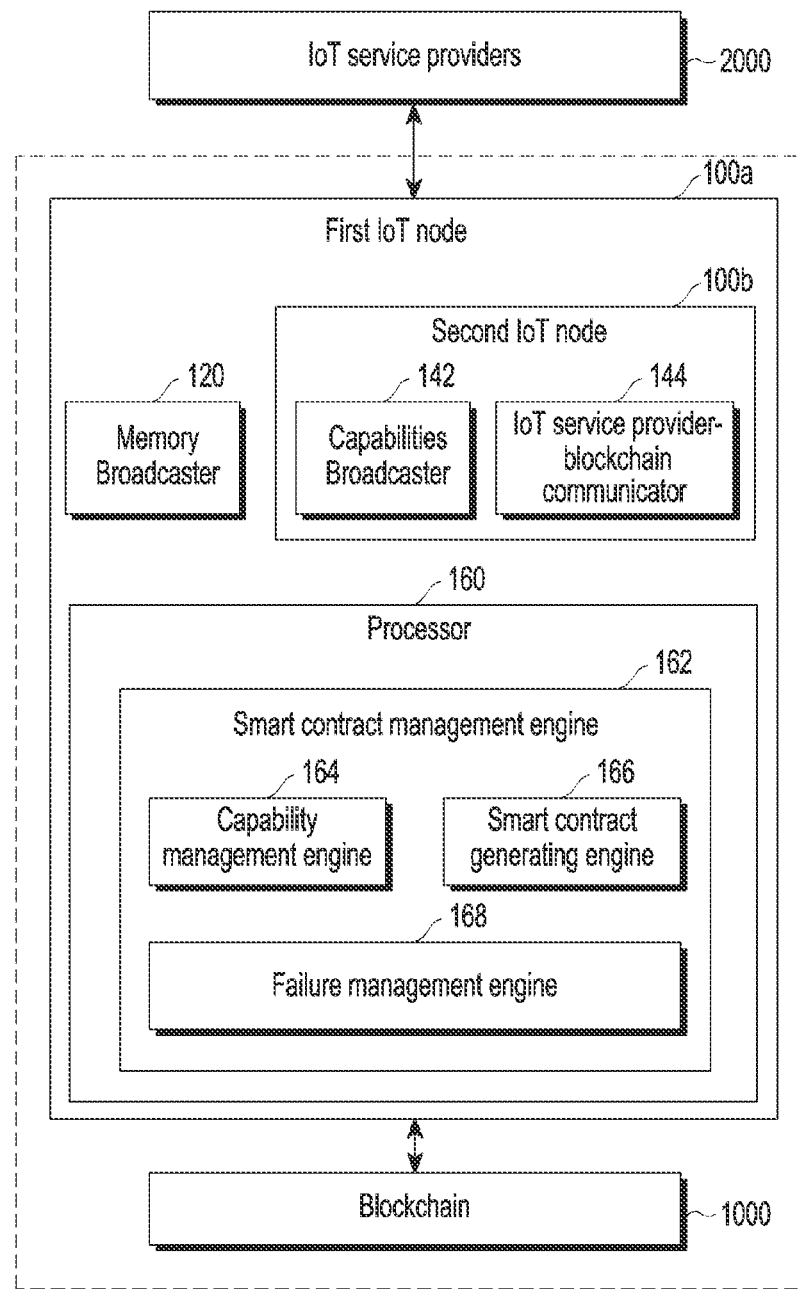
FIG. 1 is a block diagram illustrating an example first IoT node for resource management in a blockchain based internet of things (IoT) network comprising a plurality of IoT nodes connected with each other using the block chain, according to various embodiments.

The various example embodiments disclosed and described herein and the various features and advantageous details thereof are explained more fully with reference to the non-limiting embodiments illustrated in the accompanying drawings and detailed in the following disclosure. Descriptions of well-known components and processing techniques may be omitted so as to not unnecessarily obscure the embodiments herein. The various example embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the various example embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally simply used to distinguish one element from another.

Accordingly the embodiments herein disclose a method for resource management in a blockchain based internet of things (IoT) network comprising a plurality of IoT nodes connected with each other using block chain. Example methods may include receiving, by at least one first IoT node of the plurality of IoT nodes, at least one capability information of at least one second IoT node of the plurality of IoT nodes from the block chain based IoT network. The at least one capability information may be associated with the at least one second IoT node. Further, the method may include generating, by the at least one first IoT node, a smart contract to be executed between the at least one first IoT node and the at least one second IoT node based on the at least one capability information associated with the at least one second IoT node, and at least one parameter associated with the at last one first IoT node and the at least one second IoT node. Furthermore, the method may include executing, by the at least one first IoT node, the smart contract with the at least one second IoT node; and communicating, by the at least one first IoT node, with the at least one second IoT node based on the execution.

In the conventional methods and systems, interactions between the IoT nodes are enabled through an IoT cloud. The IoT nodes send individual event information to the IoT cloud (either directly, or indirectly via a hub), and the IoT cloud sends commands to various IoT nodes. The IoT nodes act according to the command provided by the IoT cloud. Therefore, a constant connection with the IoT cloud is required for receiving the commands, updated policies, etc. by the IoT network. Unlike to the conventional methods and systems, in the proposed method the IoT nodes are connected to each other using the blockchain and the interactions between the IoT nodes are enabled through the blockchain without the requirement of an active involvement of cloud/any external entity. Though, the local blockchain might be connected to an external IoT service provider's blockchain (through some network), the connection need not be dedicated. This is just required to push the policies, as and when required.

Referring now to the drawings and more particularly to FIGS. 1 through 10, where similar reference characters denote corresponding features throughout the figures, various example embodiments are illustrated and described.

FIG. 1 is a block diagram illustrating an example first IoT node (100*a*) for resource management in a blockchain based internet of things (IoT) network comprising a plurality of IoT nodes connected with each other using block chain, according to various embodiments.

Referring to FIG. 1, consider a smart environment comprising a plurality of IoT nodes connected with each other using the block chain (1000) and also connected to a plurality of IoT service providers (2000). The plurality of IoT nodes are also blockchain nodes. The communication between the plurality of IoT nodes in the IoT network are stored on the blockchain and all policies to generate smart contracts used by the plurality of IoT nodes for interaction and diagnostic scripts are pushed by the plurality of IoT service providers through the blockchain. Therefore, the blockchain enables easy and faster detection of any failure of the at least one IoT node of the plurality of IoT nodes. Further, the blockchain also enables easy resolution of the failure of the at least one IoT node. The failed IoT node and the liable IoT service provider (in case of erroneous policy) can be tracked due to the use of the blockchain.

The first IoT node (100*a*) and a second IoT node (100*b*) may be one and the same and may refer to any electronic device which forms an IoT node in the IoT network. For example, the first IoT node (100*a*) may be but not limited to a mobile phone, a smart phone, Personal Digital Assistant (PDA), a tablet, a wearable device, etc. The first IoT node (100*a*) may also be any consumer electronic devices such as a refrigerator, an air conditioner, a television, a speaker, a thermostat, a washing machine, hub, etc. The first IoT node (100*a*) may also be a hub to which constrained devices like bulb, sensor, etc., are connected as clients. The demarcation of a device as a node or client is a known art and is usually based on whether a device is computationally capable to run the underlying blockchain framework or not, since computing power can be one of the drawbacks. Therefore, the first IoT node (100a) is any electronic device which is part of the blockchain based IoT network and computationally capable of running the underlying blockchain framework as the node or as the client to a node.

The first IoT node (100a) includes a memory (120), a communicator (e.g., including communication circuitry) (140) and a processor (e.g., including processing circuitry) (160).

The memory (120) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The "non-transitory" storage medium is not embodied in a carrier wave or a propagated signal. However, the term "non-transitory" should not imply that the memory (120) is non-movable. In some examples, the memory (120) is configured to store larger amounts of information. In certain examples, a non-transitory storage medium may store data that can, over time, change (e.g., in Random Access Memory (RAM) or cache).

In an embodiment, the communicator (140) includes various communication circuitry, including a capabilities broadcaster (142) and an IoT service provider-blockchain communicator (144).

The capabilities broadcaster (142) is configured to receive at least one capability information of the at least one second IoT node (100b) of the plurality of IoT nodes from the block chain based IoT network. The at least one capability information is associated with the at least one second IoT node (100b). The capabilities broadcaster (142) may also be configured to notify the at least one failed capability to the at least one second IoT node (100b). In case the at least one second IoT node (100b) is not on-boarded into the blockchain based IoT network, then the at least one capability information of the at least one second IoT node (100b) may be received by the at least one first IoT node (100a) by one of but not limited to any wireless communication mediums such as Wi-Fi, ZigBee, Bluetooth, etc. However, when the at least one second IoT node (100b) is already part of the blockchain based IoT network, then the at least one capability information of the at least one second IoT node (100b) may be received by the at least one first IoT node (100a) through the underlying blockchain of the blockchain based IoT network. The at least one capability is for example, audio volume, temperature measurement, luminance measurement, TV channel, motion sensor, presence sensor, etc. In an example consider that the first IoT node (100a) is a television and the corresponding at least one capability information may include but not limited to a number of TV Channels, a range of audio volume and a current audio volume, switch, switch level, media input source, etc.

In an embodiment, the capabilities broadcaster (142) may be configured to send the at least one capability information to the at least one second IoT node (100b) of the plurality of IoT nodes from the block chain based IoT network. The at least one capability information is associated with the at least one first IoT node (100a).

The IoT service provider-blockchain communicator (144) may be configured to send metadata associated with the first IoT node (100a) to a plurality of IoT service providers. The metadata associated with the first IoT node (100a) may be written to the blockchain of which the first IoT node (100a) is a part and also to the blockchain of the plurality of IoT service providers, which receive the metadata associated with the first IoT node (100a). Further, the IoT service provider-blockchain communicator (144) may be configured to receive smart contract generation policy from the plurality of IoT service providers. The smart contract generation policy is written to the IoT service provider blockchain as well as the blockchain of which the first IoT node (100a) is part of. Further, the IoT service provider-blockchain communicator (144) is also configured to receive diagnostic script from the plurality of IoT service providers which is used for detecting at least one failed capability of the at least one second IoT node (100b). The diagnostic script is written to the IoT service provider blockchain as well as the blockchain of which the first IoT node (100a) is part of.

The processor (160) includes various processing circuitry and a smart contract management engine (e.g., including various processing circuitry and/or executable program elements) (162). The smart contract management engine (162) includes a capability management engine (e.g., including various processing circuitry and/or executable program elements) (164), a smart contract generating engine (e.g., including various processing circuitry and/or executable program elements) (166) and a failure management engine (e.g., including various processing circuitry and/or executable program elements) (168).

In an embodiment, the capability management engine (164) may be configured to detect the at least one capability information received from the at least one second IoT node (100b) is one of a new capability of the at least one second IoT node (100b), a failed capability of the at least one second IoT node (100b) and a change in at least one existing capability of the at least one second IoT node (100b). Further, the capability management engine (164) may be configured to determine a level of match between the at least one capability information received from the at least one second IoT node (100b) and an existing capability of the at least one first IoT node (100a) based on at least one parameter associated with the at last one first IoT node (100a) and the at least one second IoT node (100b). The at least one parameter associated with the at last one first IoT node (100a) is a type of communication between the at least one first IoT node (100a) and the at least one second IoT node (100b), a level of communication between the at least one first IoT node (100a) and the at least one second IoT node (100b), a computing power of the at least one first IoT node, and a computing power of the at least one second IoT node (100b). The IoT nodes may have various capabilities but may be limited in computing power. Therefore, the IoT node may run smart contract corresponding to only a subset of the capabilities. In such cases, the IoT node acts as a node for such capabilities for which the IoT node can run a smart contract and act as client to some other powerful IoT node for other capabilities.

The type of communication between the at least one first IoT node (100a) and the at least one second IoT node (100b) includes but not limited to any wireless communication mediums such as Wi-Fi, ZigBee, Bluetooth, etc.

The level of communication between the at least one first IoT node (100a) and the at least one second IoT node (100b) indicates a number of capabilities that match between the at least one first IoT node (100a) and the at least one second IoT node (100b). For example, consider that the first IoT node (100a) receives a list of 10 capabilities from the second IoT node (100b), of which a match is found only for 3 capabilities. Yet, the first IoT node (100a) and the second IoT node (100*b*) will be able to interact based on the match of the 3 capabilities. Hence, the level of communication may not be complete (i.e., 100%) but the communication is possible to a level.

In an embodiment, the smart contract generating engine (166) may be configured to generate a smart contract to be executed between the at least one first IoT node (100*a*) and the at least one second IoT node (100*b*) based on the at least one capability information associated with the at least one second IoT node (100*b*) and the at least one parameter associated with the at last one first IoT node (100*a*) and the at least one second IoT node (100*b*). In order to generate the smart contract, the smart contract generating engine (166) uses the level of match between the at least one capability information received from the at least one second IoT node (100*b*) and an existing capability of the at least one first IoT node (100*a*) determined by the capability management engine (164). The smart contract comprises a list of possible interactions between the at least one first IoT node (100*a*) and the at least one second IoT node (100*b*) based on the level of match of the at least one capability of the at least one second IoT node (100*b*) and the existing capability of the at least one first IoT node (100*a*). The smart contract generation is guided by the smart contract generation policy and is stored in the underlying blockchain of the blockchain based IoT network. The smart contract provides security, permanence and immutability that the blockchain offers to the IoT network. For every interaction between the at least one second IoT node (100*b*) and the at least one first IoT node (100*a*), the smart contract is automatically executed and a new block is added to the blockchain. Further, the smart contracts cannot easily be amended or terminated unless the terms for the same are incorporated during the generation of the smart contract, which may be determined based on the smart contract generation policy.

Examples for the level of match between the at least one capability information received from the at least one second IoT node (100*b*) and the existing capability of the at least one first IoT node (100*a*) includes, but is not limited to, a match between a temperature measurement capability of an air conditioner and the temperature measurement capability of a temperature sensor, the audio volume controlling capability of the TV/Speaker and a color controlling capability of the bulb, a speed controlling capability of a ceiling fan and the temperature measurement controlling capability of the temperature sensor, a motion sensing capability of a motion detector and a switching capability of the bulb, a motion sensing capability of the motion detector and thermostat set-point of the indoor thermostat, etc.

When the at least one capability information is the new capability of the at least one second IoT node (100*b*) then the smart contract generating engine (166) generates the smart contract based on a level of match between the new capability of the at least one second IoT node (100*b*) and the existing capability of the at least one first IoT node (100*a*) based on the at least one parameter associated with the at last one first IoT node (100*a*) and the at least one second IoT node (100*b*), determined by the capability management engine (164).

When the at least one capability information corresponds to the change in at least one existing capability of the at least one second IoT node (100*b*) then the smart contract generating engine (166) re-generates the smart contract based on a level of match between the change in the at least one existing capability of the at least one second IoT node (100*b*) and the existing capability of the at least one first IoT node (100*a*) based on the at least one parameter associated with the at last one first IoT node (100*a*) and the at least one second IoT node (100*b*), determined by the capability management engine (164).

When the at least one capability information corresponds to at least one failed capability of the at least one second IoT node (100*b*) then the smart contract generating engine (166) determines at least one alternate capability for the at least one failed capability of the at least one second IoT node (100*b*) in the IoT network. Further, the smart contract generating engine (166) re-generates the smart contract based on a level of match between the at least one alternate capability of the at least one second IoT node (100*b*) and the existing capability of the at least one first IoT node (100*a*) based on at least one parameter associated with the at last one first IoT node (100*a*) and the at least one second IoT node (100*b*), determined by the capability management engine (164). Once the smart contract has been deployed and is operational, human intervention is not required even in case of failed transactions where the smart contract is regenerated using alternate capabilities of the at least one another second IoT node (100*b*), thereby reducing the costs of the human intervention.

The generation of the smart contract is based on a smart contract generation policy which may be at least one of: IoT service provider determined and user determined. The IoT service provider in a smart building environment can be for example multiple authorities responsible for managing the IoT network. In a smart city the IoT service providers may be various administrative departments which are responsible for providing various smart services, IoT vendors, etc.

In another embodiment, the smart contract may be generated by both the at least one first IoT node (100*a*) and the at least one second IoT node (100*b*).

The smart contract generating engine (166) may be configured to determine a sensitive data and non-sensitive data in the smart contract and split the smart contract into a first contract and a second contract. The first contract comprises the sensitive data and the second contract comprises the non-sensitive data. Further, the smart contract generating engine (166) is configured to execute the first contract and offload the second contract to be executed by the at least one first IoT device to at least one external entity. The at least one external entity may include but not limited to: an IoT node in another smart environment which is connected to the smart environment of the at last one first IoT node (100*a*) and the at least one second IoT node (100*b*); a remote server, a cloud, etc.

In an embodiment, the failure management engine (168) may be configured to execute a diagnostic script present in an existing smart contract with the at least one second IoT node (100*b*) and detect that the at least one capability information corresponds to the at least one failed capability of the at least one second IoT node (100*b*) based on the execution of the diagnostic script. The diagnostic script is one of: service provider determined and user determined.

In general, sensor values and IoT node readings should be within some reasonable limits that may depend on the IoT node or other scenarios. For example, a conventional room AC cannot give −100° C. cooling or a thermostat in a house should not give 100° C. as room temperature. In the event of the plurality IoT nodes having same capabilities, the system can query their respective sensor values, and reach at a common view of the communication (through consensus) e.g. the AC and thermostat temperature values. The sensors and the plurality IoT nodes should independently perform the actions that correspond to the specified user intent. For example, if user increased the temperature by 10° C., then the temperature sensor should verify the same. Any transaction which contradicts the above is a failed transaction. The failure management engine (168) detects the failing capability along with the corresponding faulty IoT node and replace the IoT node with an equivalent matching capability from the at least one second IoT node (100b).

For example, when the AC's temperature sensor and thermostat's temperature sensor show different readings, a diagnostic script will make changes to the AC temperature reading (e.g. first increase, then decrease temperature), and then observe subsequent behavior of both the temperature sensors. Therefore, the faulty IoT node is identified and the other IoT node can be used to replace that failed capability of the faulty IoT node.

Although the FIG. 1 shows the hardware elements of the first IoT node (100a), it is to be understood that other embodiments are not limited thereto. In other embodiments, the first IoT node (100a) may include less or more number of elements. Further, the labels or names of the elements are used only for illustrative purpose and does not limit the scope of the disclosure. One or more components can be combined together to perform same or substantially similar function.

Figure 2A:
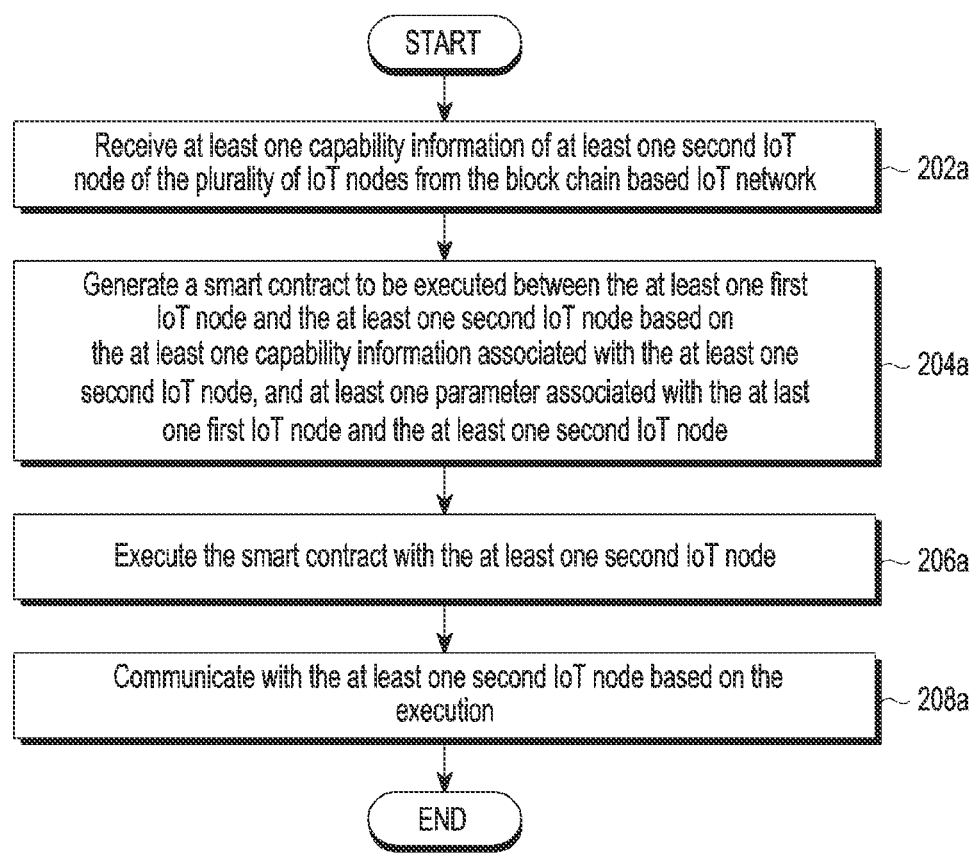
FIG. 2A is a flowchart illustrating an example method for resource management in the blockchain based IoT network comprising the plurality of IoT nodes connected with each other using the block chain, according to various embodiments.

FIG. 2A is a flowchart illustrating an example method for resource management in the blockchain based IoT network comprising the plurality of IoT nodes connected with each other using the block chain, according to various embodiments.

Referring to FIG. 2A, at step (the term "step" may be interchangeably used with the term "operation") 202a, the first IoT node (100a) receives the at least one capability information of the at least one second IoT node (100b) of the plurality of IoT nodes from the block chain based IoT network. For example, in the first IoT node (100a) as illustrated in the FIG. 1, the communicator (140) can be configured to receive the at least one capability information of the at least one second IoT node (100b) of the plurality of IoT nodes from the block chain based IoT network.

At step 204a, the first IoT node (100a) generates the smart contract to be executed between the at least one first IoT node (100a) and the at least one second IoT node (100b) based on the at least one capability information associated with the at least one second IoT node, and at least one parameter associated with the at last one first IoT node (100a) and the at least one second IoT node. For example, in the first IoT node (100a) as illustrated in the FIG. 1, the processor (160) can be configured to generate the smart contract to be executed between the at least one first IoT node (100a) and the at least one second IoT node (100b) based on the at least one capability information associated with the at least one second IoT node, and at least one parameter associated with the at last one first IoT node (100a) and the at least one second IoT node.

At step 206a, the first IoT node (100a) executes the smart contract with the at least one second IoT node (100b). For example, in the first IoT node (100a) as illustrated in the FIG. 1, the processor (160) may be configured to execute the smart contract with the at least one second IoT node (100b).

At step 208a, the first IoT node (100a) communicates with the at least one second IoT node (100b) based on the execution. For example, in the first IoT node (100a) as illustrated in the FIG. 1, the communicator (140) may be configured to communicate with the at least one second IoT node (100b) based on the execution.

The various actions, acts, blocks, steps, operations, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 2B:
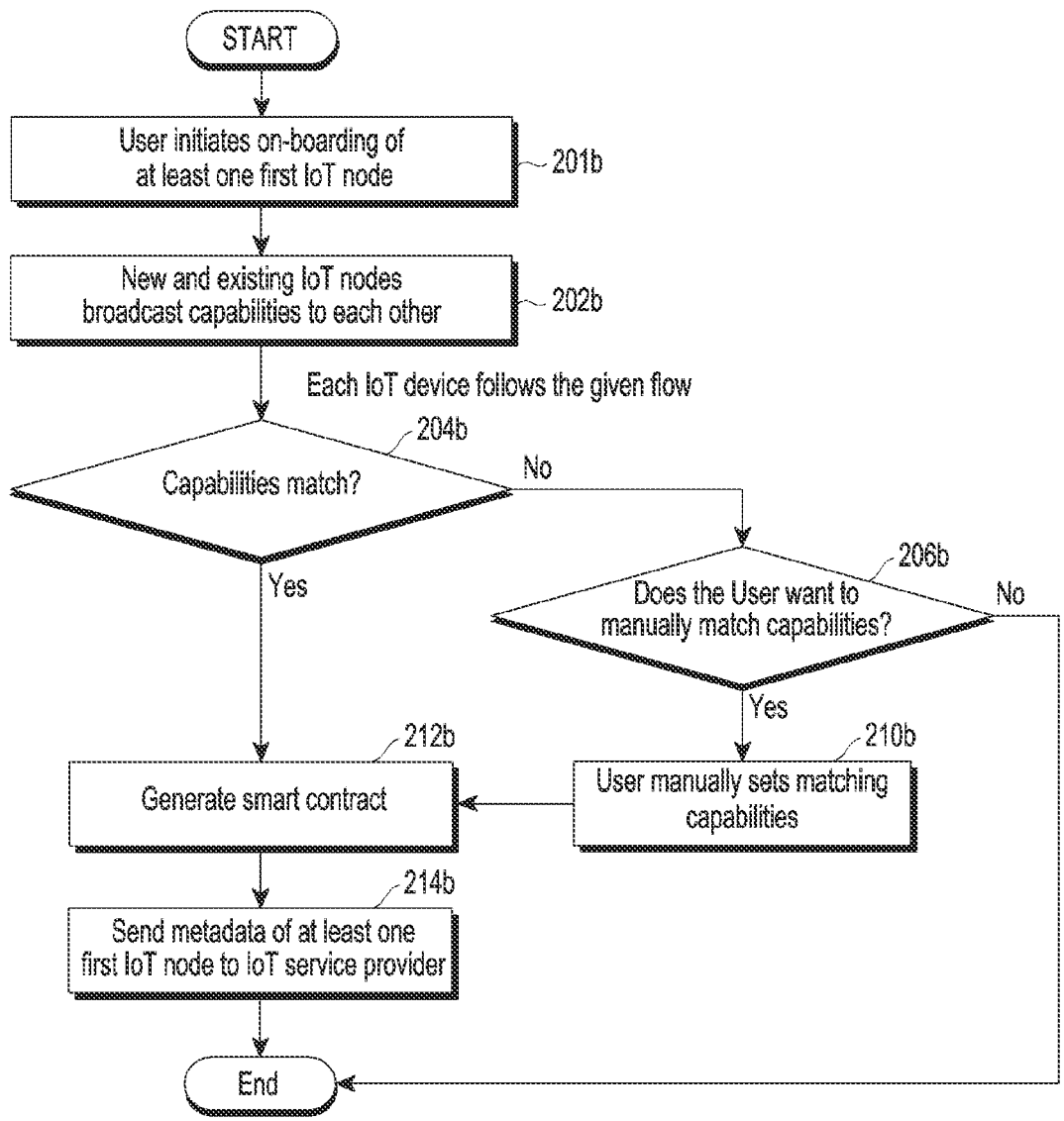
FIG. 2B is a flowchart illustrating an example method for generating a smart contract by the first IoT node in the blockchain based IoT network based on new capabilities and change in existing capabilities of at least one second IoT node, according to various embodiments.

FIG. 2B is a flowchart illustrating an example method for generating the smart contract by the first IoT node (100a) in the blockchain based IoT network based on new capabilities and change in existing capabilities of the at least one second IoT node (100b), according to various embodiments.

Referring to FIG. 2B, at step 201, a user initiates on-boarding of the at least one first IoT node (100a). The at least one first IoT node (100a) and the at least one second IoT node (100b) broadcast individual capabilities to each other at step 202b.

At step 204b, the at least one first IoT node (100a) determines whether the capabilities of the at least one first IoT node (100a) and the at least one second IoT node (100b) matches.

On determining that the capabilities of the at least one first IoT node (100a) and the at least one second IoT node (100b) does not match ("No" at operation 204b), at step 206b, the at least one first IoT node (100a) determines whether the user wants to manually match the capabilities of the at least one first IoT node (100a) and the at least one second IoT node (100b).

At step 208b, if the user does not want to manually match the capabilities of the at least one first IoT node (100a) and the at least one second IoT node (100b) ("No" at operation 206b), then the at least one second IoT node (100b) is not on-boarded to the blockchain based IoT network.

At step 210b, if the user wants to manually match the capabilities of the at least one first IoT node (100a) and the at least one second IoT node (100b) ("Yes" at operation 206b), then the at least one first IoT node (100a) determines the matching capabilities manually set by the user. Further, at 212b, the at least one first IoT node (100a) generates the smart contract based on the matching capabilities manually set by the user.

At step 214b, the at least one first IoT node (100a) then sends the metadata of the at least one first IoT node (100a) to the IoT service providers.

At 204b, if the capabilities of the at least one first IoT node (100a) and the at least one second IoT node (100b) matches ("Yes" at operation 204b), then the at least one first IoT node (100a) at step 212b, generates the smart contract based on the matching capabilities and at step 214b, sends the metadata of the at least one first IoT node (100a) to the IoT service providers.

Figure 2C:
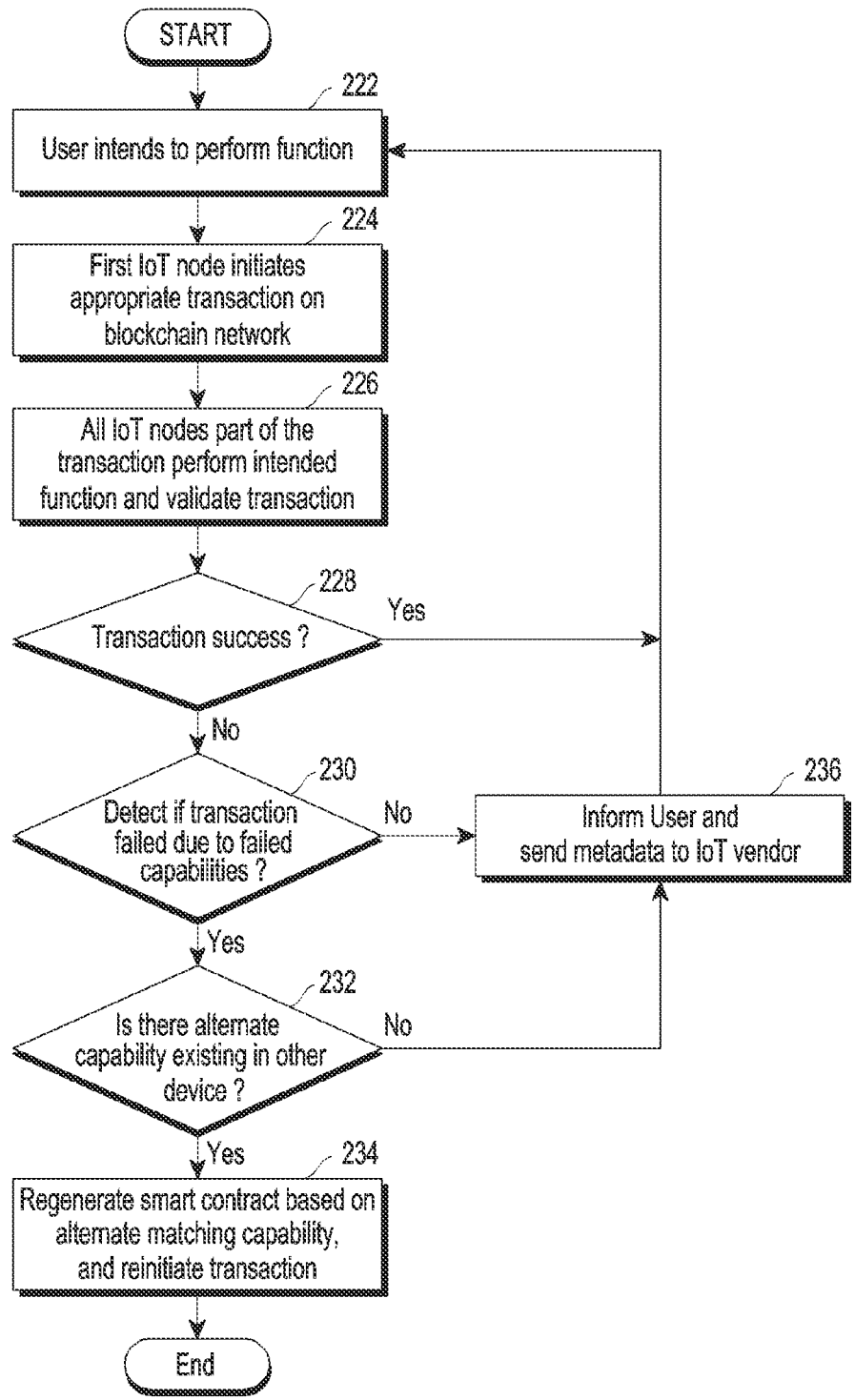
FIG. 2C is a flowchart illustrating an example method for handling capability failure of the at least one second IoT node by the first IoT node in the blockchain based IoT network, according to various embodiments.

FIG. 2C is a flowchart illustrating an example method for handling capability failure of the at least one second IoT node (100b), by the first IoT node (100a) in the blockchain based IoT network, according to various embodiments.

Referring to FIG. 2C, at step 222, the first IoT node (100a) determines that the user intends to perform some function for example share a video file of size 35 MB.

At step 224, the first IoT node (100a) initiates the appropriate transaction on the blockchain network to send the video file.

At step 226, the IoT nodes which are part of the transaction perform intended function and validate the transaction.

At step 228, the first IoT node (100a) determines whether the transaction is successful. In response to determining that the transaction is successful ("Yes" at operation 228), the first IoT node (100a) loops back to step 222 to perform the next transaction.

In response to determining that at step 228, the transaction is not successful ("No" at operation 228), the first IoT node (100a) at step 230, determines whether the transaction failed due to failed capabilities of the at least one second IoT node (100b). Further, at step 232, the first IoT node (100a) determines whether alternate capability for the failed capability of the at least one second IoT node (100b) is available in any IoT node in the IoT network. At step 234, on finding the IoT node in the IoT network with the alternate capability for the failed capability of the at least one second IoT node (100b), the first IoT node (100a) regenerates the smart contract based on the matching of the alternate capability and reinitiates the transaction.

In response to determining at step 230 that the transaction did not fail ("No" at operation 230), the first IoT node may inform the user and send metadata to the IoT vendor at operation 236. Further, if it determined at step 232 that there is no alternate capability existing in another device ("No" at operation 232), the first IoT node may inform the user and send metadata to the IoT vendor at operation 236.

Figure 3:
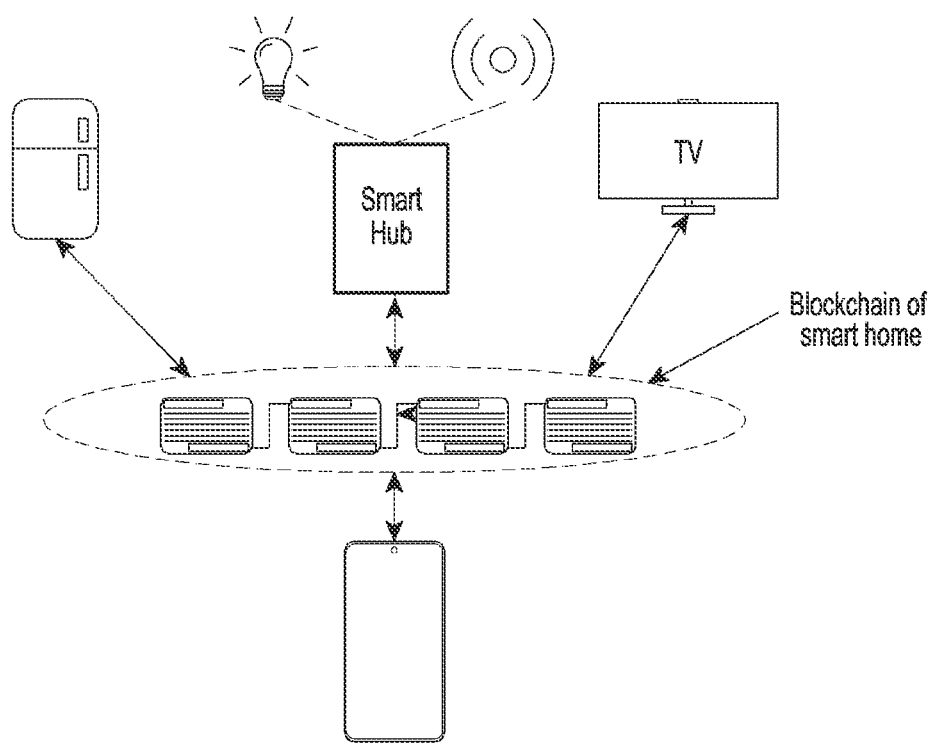
FIG. 3 is a diagram illustrating an example blockchain based smart home, according to various embodiments.

FIG. 3 is a diagram illustrating an example of a blockchain based smart home, according to various embodiments.

Referring to FIG. 3, consider a blockchain based smart home comprising a plurality of IoT nodes. In the blockchain based smart home powerful devices like a television, a refrigerator, a smartphone, a smart hub, etc., act as IoT nodes.

However, constrained devices such as for example bulb, sensor, etc., act as clients to some nodes such as the smart hub. The demarcation of a device as the IoT node or the client is determined based a computational capability of the device i.e., whether the device is computationally capable to run the underlying blockchain framework or not, since computing power is one of the bottlenecks.

The IoT nodes in the smart home interact with each other via transactions through the blockchain by executing the smart contract. Each of the transactions may be added as a new block in the blockchain or as part of an existing block. Therefore, each of the blocks in the blockchain comprises at least one transaction of a plurality of transactions. The smart contract generation and the smart contract updation based on the level of match of the capabilities are obtained based on two main approaches which include a rule based approach and an AI based approach. In the rule based approach, the rule is set by one of the IoT service provider and the user. For example, the rule may include that the TV can control the smart speaker, the speaker of the mobile phone, an audio jack of the mobile phone, etc. In a smart city scenario, different sensors like smoke sensor, temperature sensor, etc. of all homes are connected via smart contract to various fire stations. In case of a fire accident in a particular house of the plurality of homes in the smart city, the sensors of the house, after consensus among themselves, may initiate a panic call to the fire station.

In an AI based approach application of a collaborative learning which includes providing a plurality of pairwise combinations of the capabilities which are matched and the users is allowed to delete the combinations of matching capabilities which the users do not like. The combinations of matching capabilities, which are not deleted by most users, are considered as valid combinations.

Further, the IoT nodes may change a state/capability based on the transactions performed to the blockchain which requires the updating of existing smart contract between the IoT nodes. The updating of existing smart contract between the IoT nodes is performed by again broadcasting the updated capability information by the IoT node whose capability is changed to all other IoT nodes in the smart home and re-generation of the smart contracts. Hence, unlike to the conventional methods and systems which require continuous connection to the cloud to perform any capability updating, in the proposed method the once the initial on-boarding of the IoT nodes is completed there is no need for the continuous connection with the cloud. Therefore, the cloud resources are drastically saved in the proposed network without the need for a continuous cloud connection.

Further, a possibility of failure of the entire smart home/IoT network due to disconnection to the cloud is also ruled out in the proposed method. Once the blockchain is functional and the smart contract generation modules are deployed in each of the devices/IoT nodes in the IoT network, the IoT network becomes self-sustaining without the need for the external cloud.

Further, the proposed method is not limited by backward compatibility. Since the interaction between the plurality of IoT nodes in the blockchain based IoT network are based on the level of match between the capabilities, the proposed method is not limited by hardware versioning.

Figure 4:
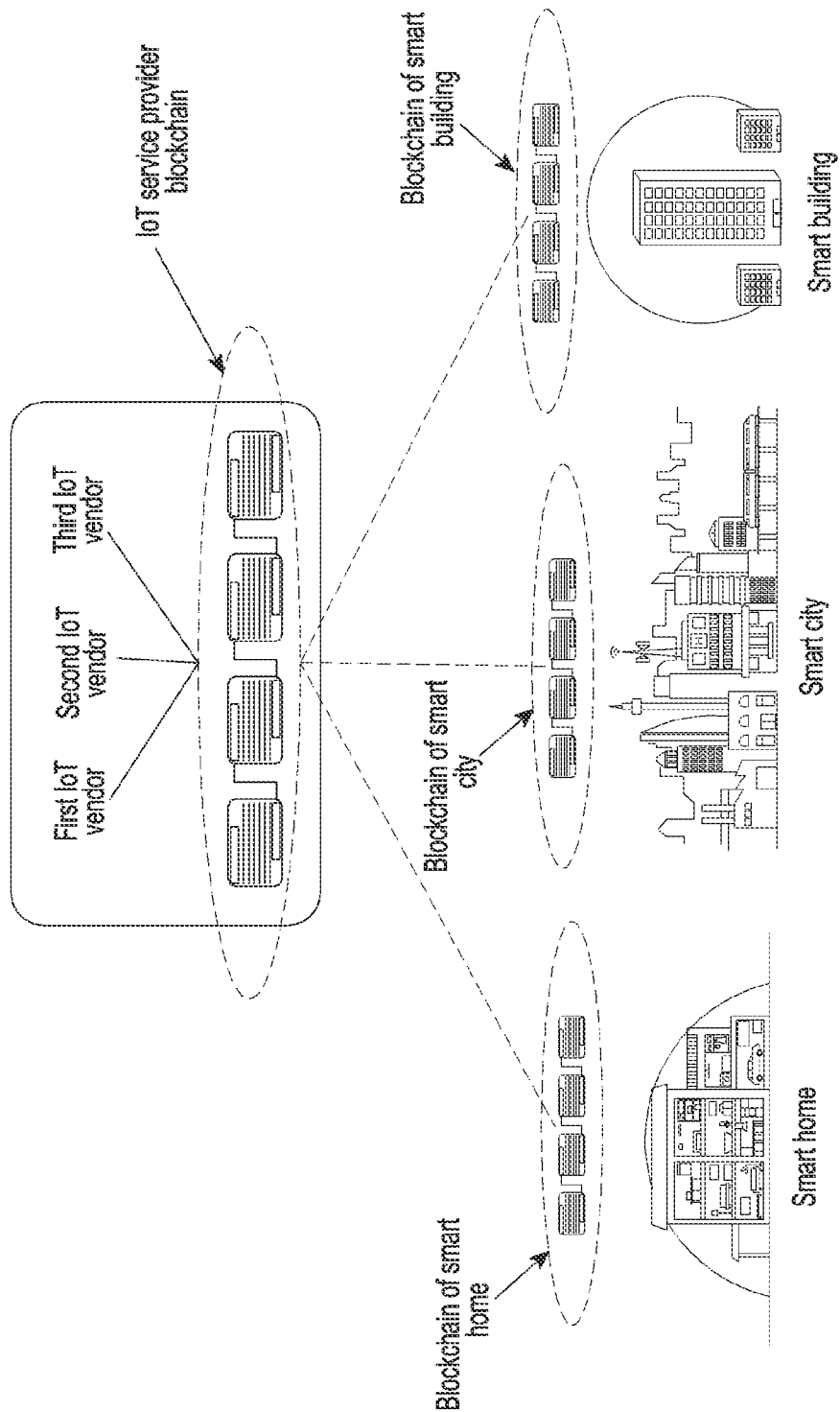
FIG. 4 is a diagram illustrating an example high-level architecture of the blockchain based IoT network, according to various embodiments.

FIG. 4 is a diagram illustrating an example of a high-level architecture of the blockchain based IoT network, according to various embodiments.

Referring to FIG. 4, in conjunction with the FIG. 3, is the high level architecture of the blockchain based IoT network comprising of plurality of blockchain based IoT networks connected to at least one blockchain of the at least one IoT service provider.

Since, the plurality of blockchain based IoT networks are connected to the at least one blockchain of the at least one IoT service provider, the at least one IoT service provider continuously pushes the various IoT related policies such as the smart contract generation policy, the diagnostic script for determining the failed capability of the IoT nodes, etc., to the plurality of blockchain based IoT networks.

Each of the blockchain based IoT network of the plurality of blockchain based IoT networks is a standalone IoT network. Each of the blockchain based IoT network comprises a plurality of IoT nodes connected to each other using the blockchain of that IoT network.

Further, a blockchain based IoT network may be connected to another blockchain based IoT network, in addition to being connected to the blockchain of the IoT service provider(s). Thus, one blockchain based IoT network enabling the offloading of the execution of the smart contract to another blockchain based IoT network (external entity).

Figure 5:
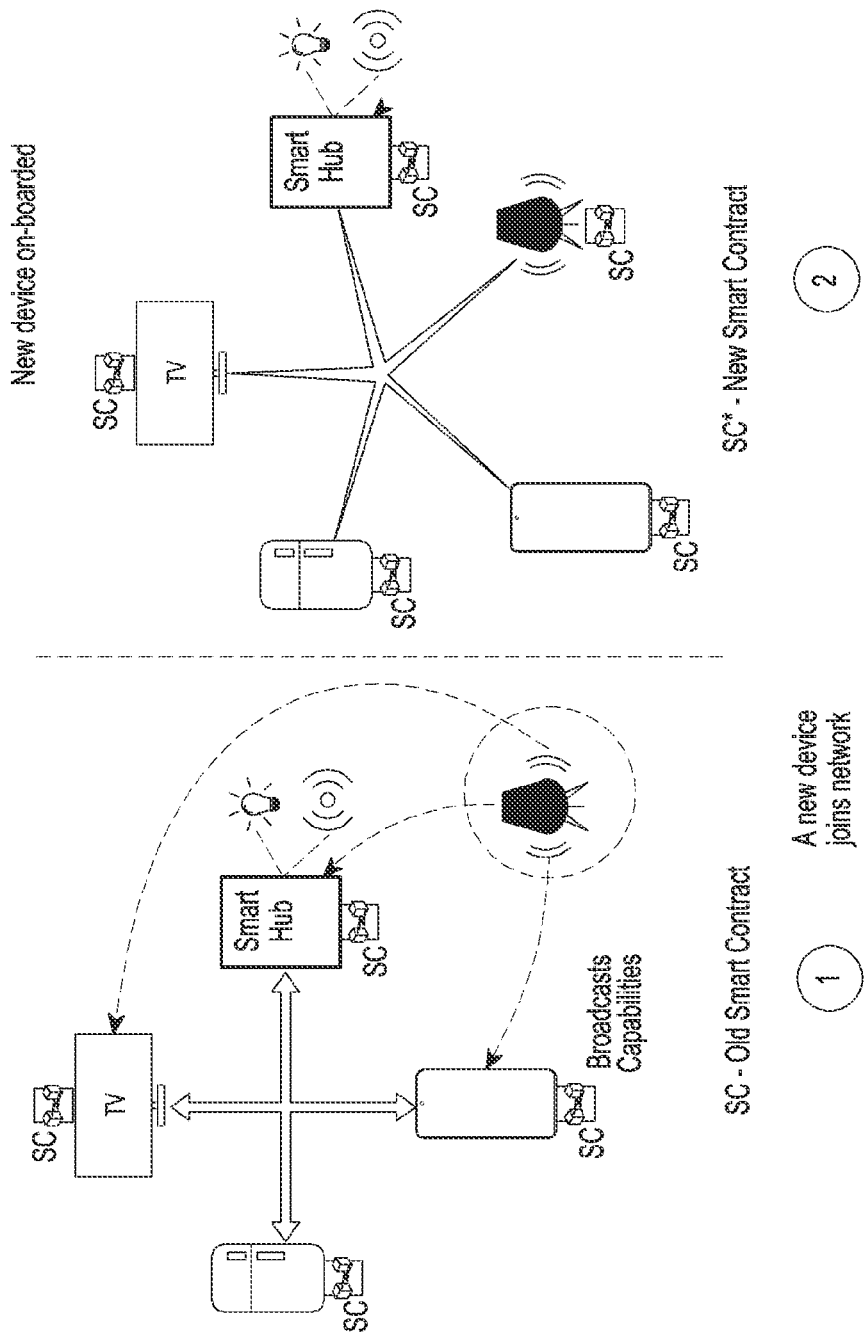
FIG. 5 is a diagram illustrating an example scenario of on-boarding of a new IoT node into the blockchain based IoT network by broadcasting at least one capability information of the new IoT node, according to various embodiments.

FIG. 5 is a diagram illustrating an example scenario of on-boarding of a new IoT node into the blockchain based IoT network by broadcasting the at least one capability information of the new IoT node, according to various embodiments.

Referring to FIG. 3, at step 1, consider a blockchain based smart home network comprising a plurality of IoT nodes which includes a television, a refrigerator, a smartphone and a smart hub. In the blockchain based smart home network, each IoT node comprises an existing smart contract (indicated as SC in FIG. 5) defining the possible communications between the said IoT node and each of the other IoT nodes. Consider that the user wants to on-board the new IoT node i.e., a speaker into the blockchain based smart home network.

In order to be on-boarded into the blockchain based smart home network, the speaker broadcasts the at least one capability information to the plurality of IoT nodes in the blockchain based smart home network.

At step 2, each of the IoT nodes in the blockchain based smart home network receives the at least one capability information broadcasted by the speaker and generates a new smart contract (SC*) based on the level of match between the at least one capability information of the speaker and the said IoT node. As the new smart contact is generated at each of the IoT nodes in the blockchain based smart home network, the on-boarding of the speaker is completed. Further, the speaker also generates a smart contract defining the possible communications with each of the IoT nodes in the blockchain based smart home network.

Thus, any further communication of the speaker with any of the IoT nodes in the blockchain based smart home network includes execution of the smart contract by both the speaker and the IoT node and communicating with the IoT node.

Figure 6:
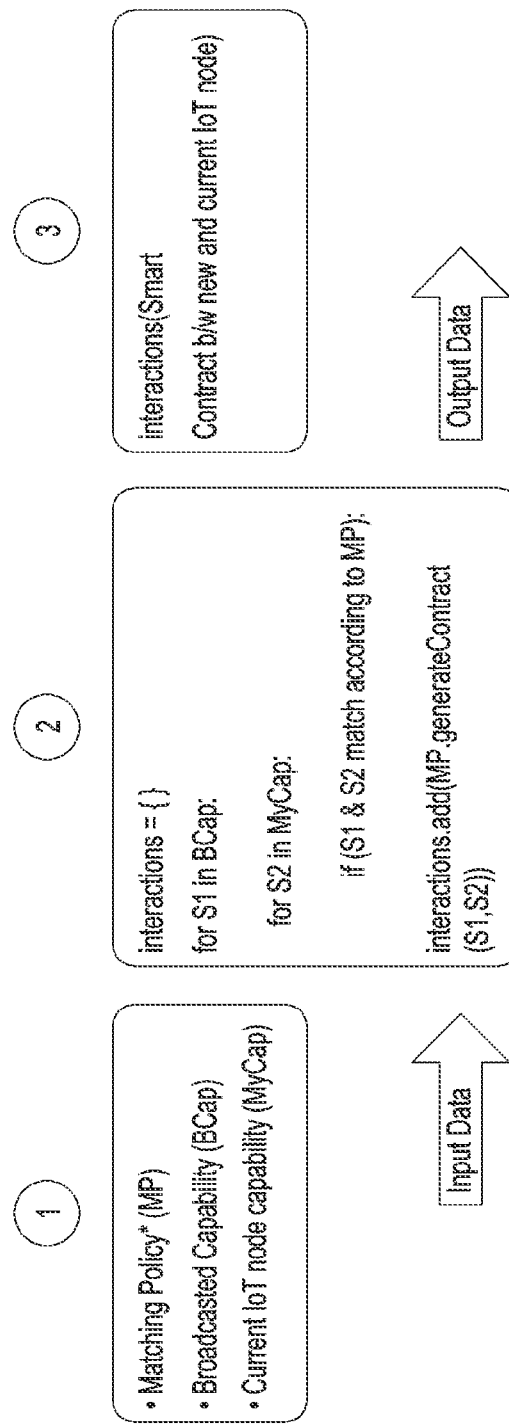
FIG. 6 is a diagram illustrating an example method of generation of the smart contract by the first IoT node based on a match of broadcasted capability of the second IoT node by a smart contract management engine, according to various embodiments.

FIG. 6 is a diagram illustrating an example method of generation of the smart contract by the first IoT node (100a) based on the match of the broadcasted capability of the second IoT node (100b) by the smart contract management engine (162), according to various embodiments.

Referring to FIG. 6, at step 1, the smart contract management engine (162) comprises a matching policy. The matching policy may be one of user defined and pushed through the IoT service providers through the blockchain network based IoT network continuously. Further, the smart contract management engine (162) also includes the received capability information of the at least one second IoT node (100b) and the existing capability of the first IoT node (100a). The smart contract management engine (162) determines the level of match between the received capability information of the at least one second IoT node (100b) and the existing capability of the first IoT node (100a) in step 2. Further, based on the level of the match, a probable interaction between the first IoT node (100a) and the at least one second IoT node (100b) is added as part of the smart contract in step 3.

The level of match refers to a number of capabilities that match between the first IoT node (100a) and the at least one second IoT node (100b). For example, consider that the TV broadcasts a plurality of capabilities which include the capability to control volume, capability to varying light intensity, capability to switch to a particular channel at a particular time based on user routine. However, a speaker in the IoT network may be able to match to only the capability to control the volume and capability to switch to the particular channel at the particular time based on user routine, whereas the capability to varying light intensity may not match. Then the smart contract generated between the TV and the speaker will have interactions with respect to the match in the capability to control the volume and the capability to switch to the particular channel at the particular time based on user routine only.

In another example, consider a temperature sensor of the AC is matched with the temperature sensor of the thermostat. If both the AC and the thermostat are present in the same room then the temperature sensor of the thermostat and the temperature sensor of the AC can be used interchangeably in the proposed method.

Further, since the interactions between the first IoT node (100a) and the second IoT (100b) are encoded as functions in the smart contract, additional diagnostic scripts can be embedded in the smart contract. These can provide additional values such as, ascertaining cause of transaction failures by looking at past transaction history and running some troubleshooting action, or defining a sequence of device interactions, according to user's daily routine, like preparing coffee in the morning etc. The diagnostic scripts are one of user defined or provided by the IoT service providers.

Figure 7:
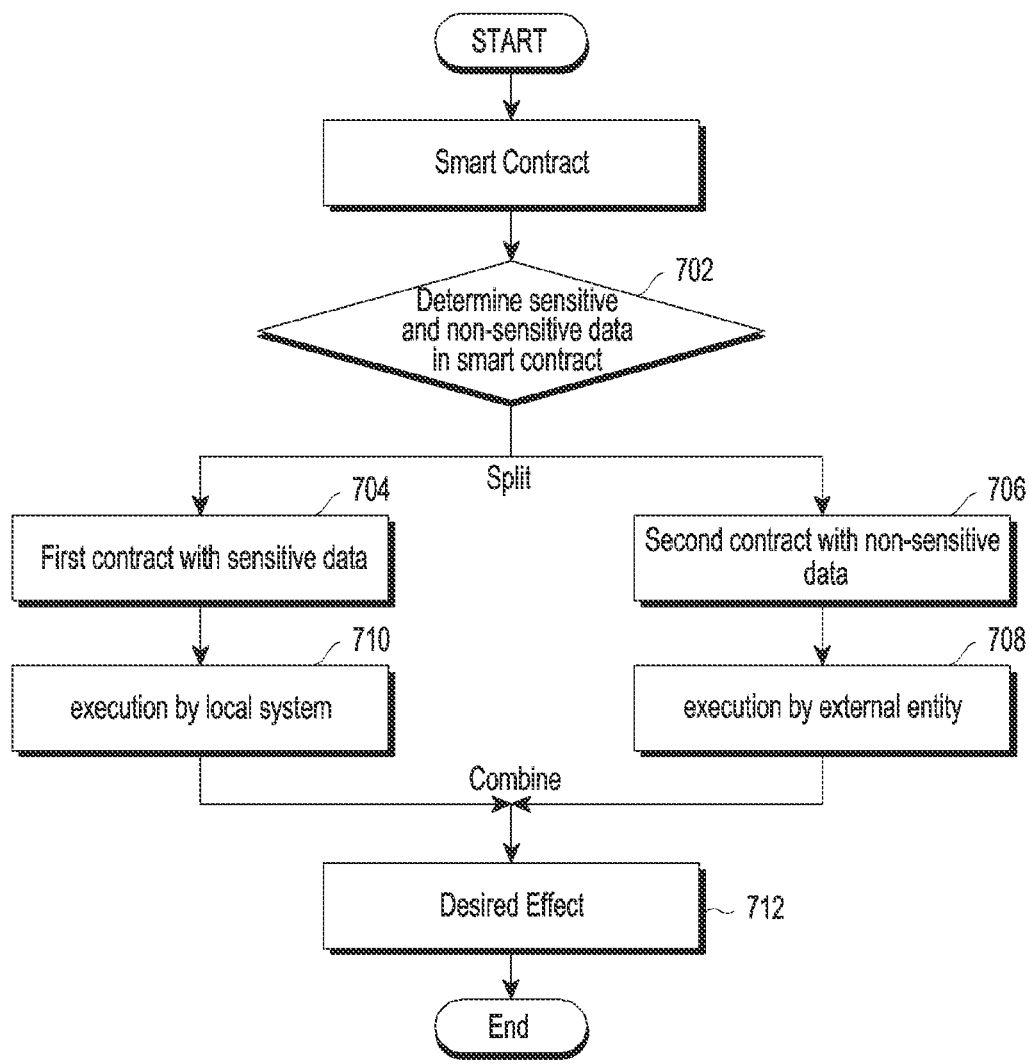
FIG. 7 is a flowchart illustrating an example method for splitting the smart contract into a first contract and a second contract based on sensitivity of data in the smart contract, according to various embodiments.

FIG. 7 is a flowchart illustrating an example method for splitting the smart contract into a first contract and a second contract based on sensitivity of the data in the smart contract, according to various embodiments.

Referring to FIG. 7, an example method which relaxes computational requirement of the smart contract execution in a local system is described. The computational requirement of the smart contract execution can reduced by off-loading certain computation to a third party, or a server of the IoT service provider, a server of another connected blockchain based IoT network (example a neighbouring smart building), etc.

At step 702, the first IoT node (100a) determines the sensitive data and the non-sensitive data in the existing smart contract between the first IoT node (100a) and the second IoT node (100b). Further, at step 704, the first IoT node (100a) splits the smart contract into a first contract which comprises the sensitive data from the existing smart contract and a second contract including non-sensitive data. The splitting of the smart contract into the first contract and the second contract can be achieved in two ways which include a vendor based decision of tagging certain data as sensitive, and any script which processes a sensitive data which may not be offloaded. Another method of splitting the smart contract includes a framework breaks the script into such components based on the present state-of-the-art program analysis techniques.

At step 706, the first IoT node (100a) splits the smart contract into a second contract which comprises the non-sensitive data from the existing smart contract. At step 708, the first IoT node (100a) offloads the second contract comprising the non-sensitive data for execution to an external entity and step 710, the first IoT node (100a) executes the first contract comprising the sensitive data.

At step 712, the first IoT node (100a) receives the combined result of the execution of the first contract and the second contract achieving the desired transaction outcome.

For example, consider that a user has setup a rule of setting the AC's temperature as average of temperature setup last year during same season. However, if the user's average body temperature over few hours is more than a normal average body temperature of the user then an ambient temperature is to be set. In the rule, the first part which includes the average of the temperature can be offloaded to an external entity and the second portion which includes sensitive health data of the user should be run on the local system.

Figure 8:
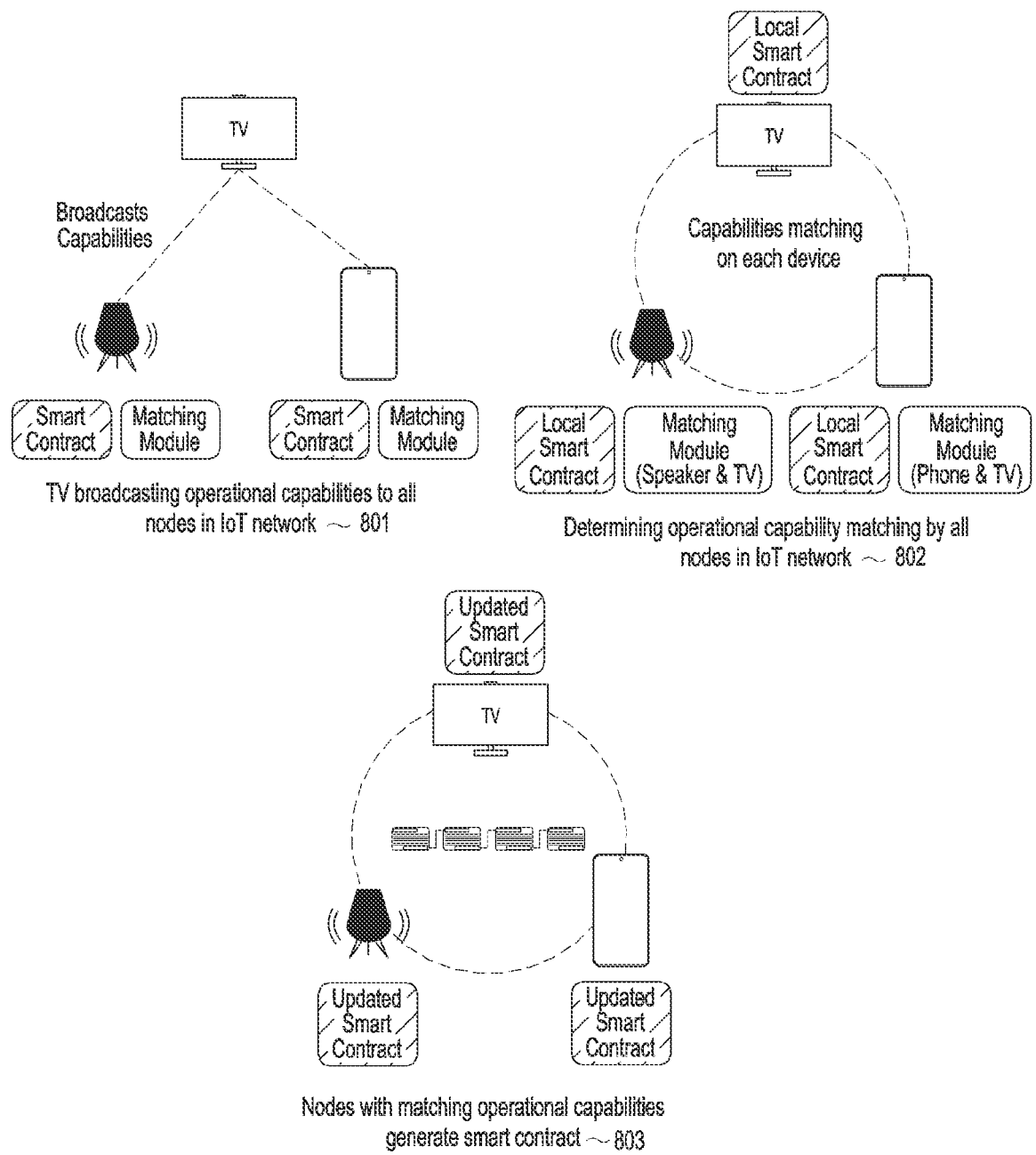
FIG. 8 is a diagram illustrating an example scenario of rule based generation of the smart contract in the blockchain based IoT network, according to various embodiments.

FIG. 8 is a diagram illustrating an example scenario of rule based generation of the smart contract in the blockchain based IoT network, according to various embodiments.

Referring to FIG. 8, consider a smart home comprising a plurality of the IoT nodes (devices) such as a TV, a speaker and a smartphone.

At step 801, the speaker and the smartphone are communicating based on the existing smart contract which includes the list of possible interactions between the speaker and the smartphone. Consider that the user introduces a new television into the smart home/IoT network and the television starts the process of on boarding into the blockchain based IoT network. The TV broadcasts the capabilities such as for example volume control, switching a channel, brightness control, etc, to the speaker and the smartphone in the blockchain based IoT network.

At step 802, each of the speaker and the smartphone determines the possible communications based on the level of match in the capabilities with the capability of the TV.

Further, each of the speaker and the smartphone encodes the possible communications with the TV as part of the individual local smart contract.

At step 803, the speaker, the smartphone and the TV sync the local smart contracts to generate the same updated copy of the smart contract. The updated copy of the smart contract contains all the possible interactions of the speaker, the smartphone and the TV with each other.

Figure 9:
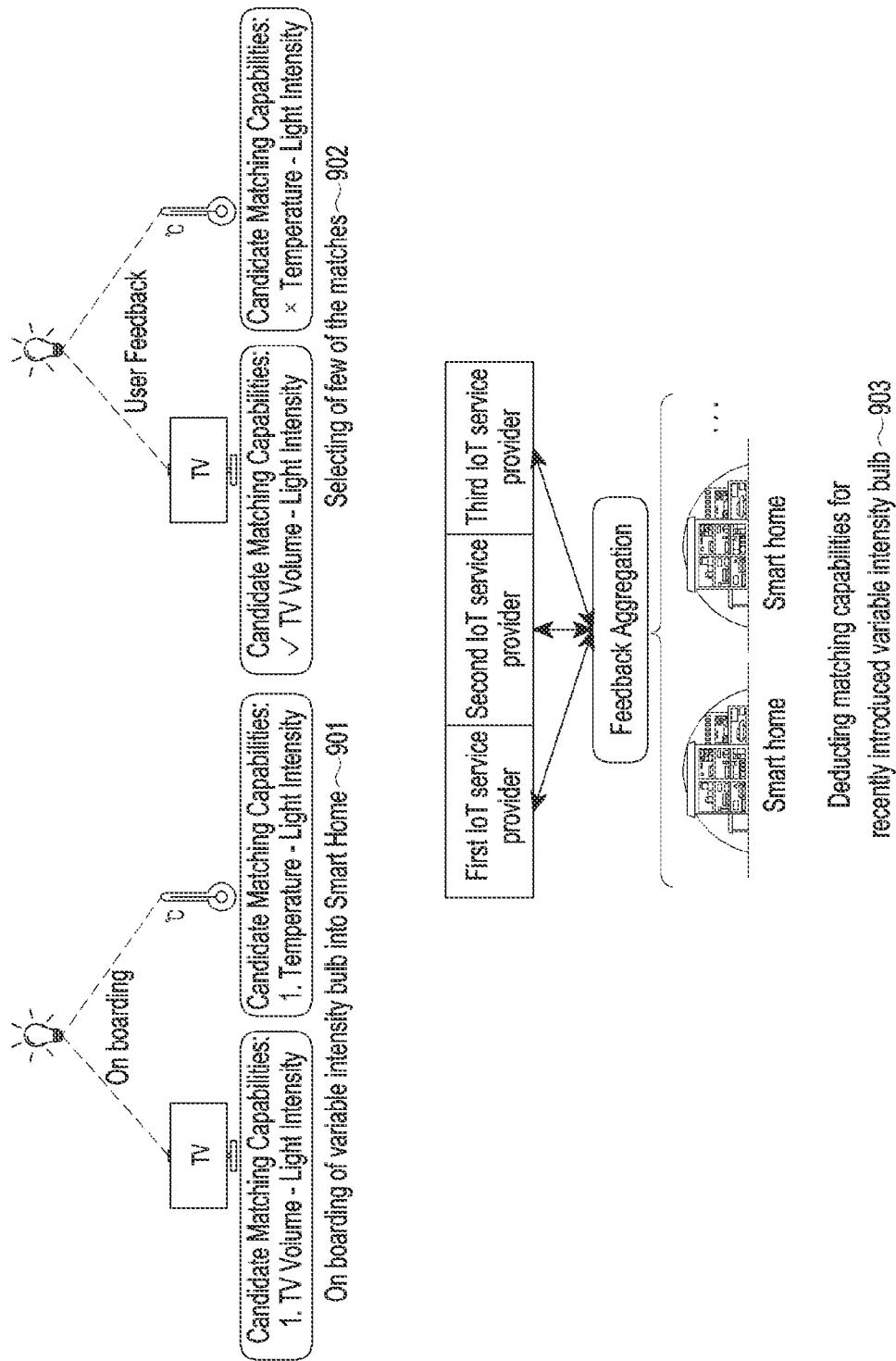
FIG. 9 is a diagram illustrating an example artificial intelligence (AI) based matching policy in the blockchain based smart home network, according to various embodiments.

FIG. 9 is a diagram illustrating an example AI based matching policy in the blockchain based smart home network, according to various embodiments.

Referring to FIG. 9, consider a variable intensity bulb which is recently introduced into market. The variable intensity bulb broadcasts the capability of light intensity to all the other devices/nodes in the smart home network to determine the device with the matching capability, as shown in step 901. For example, the capability of the TV Volume control of the TV and the capability of the light intensity control of the variable intensity bulb; the capability of the temperature control of the temperature sensor and the capability of the light intensity control of the variable intensity bulb are tried to match.

At step 902, based on the usage feedback/statistics, the manual feedback and various other parameters, the match between the capability of the light intensity control of the variable intensity bulb and the other devices is determined. Such as for example, a match between the capability of the light intensity control of the variable intensity bulb and the capability of the TV Volume control of the TV is determined as the changes in the TV volume control maybe related to the changes in the light intensity control of the variable intensity bulb in the smart home.

At step 903, a pruned list of matching IoT nodes/devices from each smart home is automatically shared with the IoT service providers without disclosing the private information of the individual users/smart home and the list is aggregated by the IoT service providers. Further, based on the appropriate statistical analysis, matching capabilities for the capability of the recently introduced device are deduced. For example, based on the usage statistics and the feedback across wide variety of smart homes, the capability of the TV volume control and the capability of the light intensity control are matching capabilities.

Figure 10:
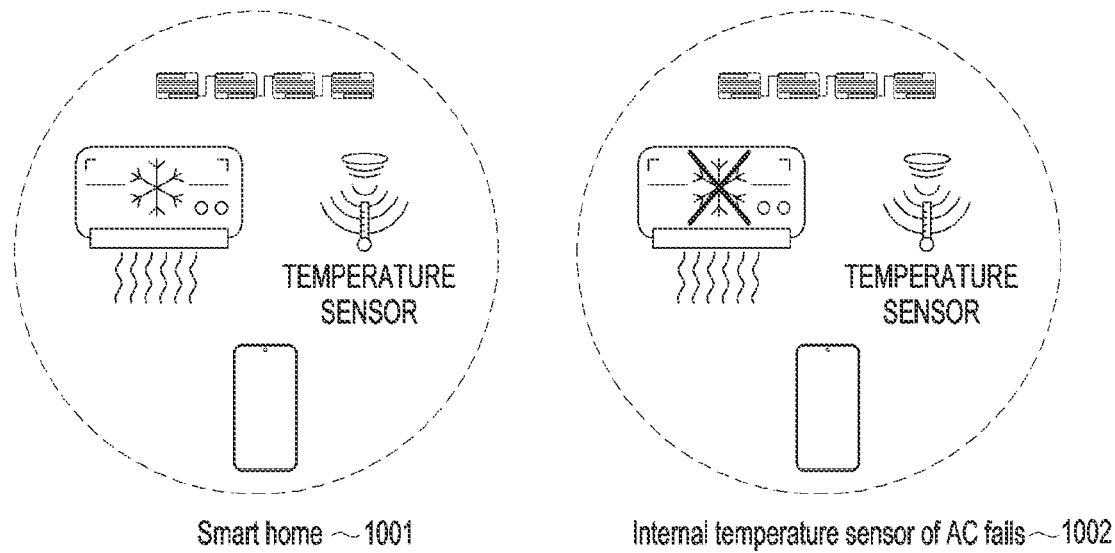
FIG. 10 is a diagram illustrating an example scenario of failed transaction where an alternate capability of the at least one second IoT node is used to complete a transaction, according to various embodiments.
Figure 10:
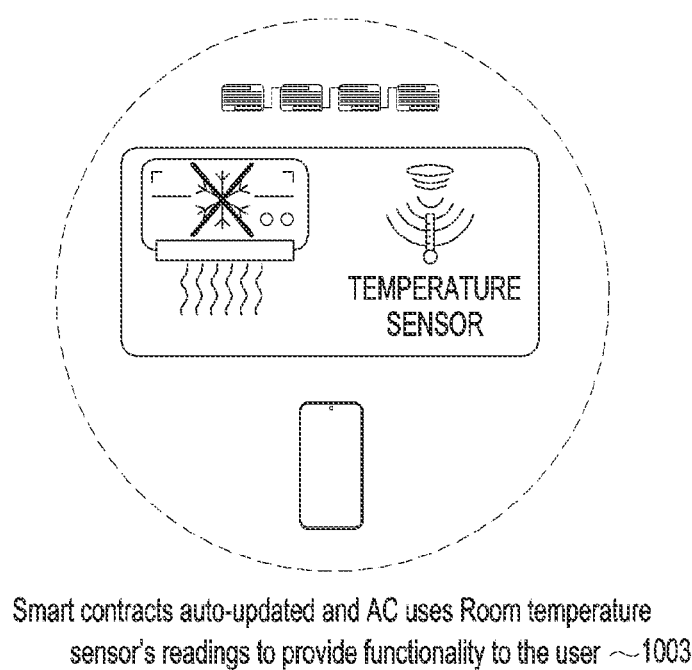

FIG. 10 is a diagram illustrating an example scenario of failed transaction where the alternate capability of the at least one second IoT node (100b) is used to complete the transaction, according to various embodiments.

Referring to FIG. 10, consider a smart home comprising a plurality of IoT nodes such as for example the air conditioner (e.g., first IoT node), a room temperature sensor (e.g., second IoT node), smartphone (e.g., third IoT node), etc, as shown in step 1001.

At step 1002, consider that the internal temperature sensor of the air conditioner fails which is detected based on no reading/response from the air conditioner, leading to the failing transactions. For example, the air conditioner provides a reading of −100° C. cooling. Due to the failed internal temperature sensor of the air conditioner, the user experience will be limited as the air conditioner will not function effectively.

At step 1003, when the failure of the internal temperature sensor of the air conditioner is detected, the air conditioner determines that the alternate capability of the room temperature sensor to provide readings and regenerates the smart contract with the room temperature sensor based on the match of the alternate capability. Further, the failed transaction is reinitiated based on the regenerated the smart contract.

Furthermore, the user is also notified about the failed internal temperature sensor of the air conditioner on the smartphone. Therefore, unlike to the conventional methods and systems, in the proposed method during the failure transaction, the alternate capability of another device in the smart home network is used to continue providing seamless experience to the user.

The various example embodiments disclosed herein can be implemented through at least one software program running on at least one hardware device and performing network management functions to control the elements. The elements include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the various example embodiments disclosed and described herein can be practiced with modification within the spirit and scope of the embodiments as described herein.

What is claimed is:

1. A method for resource management by a first internet of things (IoT) node in a blockchain based IoT network, comprising:
    receiving at least one capability information associated with at least one second IoT node from the blockchain based IoT network;
    generating a smart contract to be executed between the first IoT node and the at least one second IoT node based on the at least one capability information, and at least one parameter associated with the first IoT node and the at least one second IoT node;
    executing the smart contract with the at least one second IoT node; and
    communicating with the at least one second IoT node based on the smart contract,
    wherein said generating the smart contract comprises:
        determining whether capabilities of the first IoT node and the at least one second IoT node match;
        based on determining that the capabilities of the first IoT node and the at least one second IoT node do not match, determining whether a user manually want to match the capabilities of the first IoT node and the at least one second IoT node;
        based on determining that the user manually wants to match capabilities of the first IoT node and the at least one second IoT node, determining matched capabilities which manually set by the user; and
        generating the smart contract between the first IoT node and the at least one second IoT node based on the matched capabilities manually set by the user.

2. The method of claim 1, wherein generating the smart contract to be executed between the first IoT node and the at least one second IoT node comprises:

detecting that the at least one capability information is a new capability of the at least one second IoT node;

determining a level of match between the new capability of the at least one second IoT node and an existing capability of the first IoT node based on the at least one parameter associated with the first IoT node and the at least one second IoT node; and generating the smart contract to be executed based on the level of match.

3. The method of claim 1, wherein generating the smart contract to be executed between the first IoT node and the at least one second IoT node comprises:

detecting that the at least one capability information corresponds to a change in at least one existing capability of the at least one second IoT node;

determining a level of match between the change in the at least one existing capability of the at least one second IoT node and an existing capability of the first IoT node based on the at least one parameter associated with the first IoT node and the at least one second IoT node; and generating the smart contract to be executed based on the level of match.

4. The method of claim 1, wherein generating the smart contract to be executed between the first IoT node and the at least one second IoT node comprises:

detecting that the at least one capability information corresponds to at least one failed capability of the at least one second IoT node;

determining at least one alternate capability for the at least one failed capability of the at least one second IoT node;

determining a level of match between the at least one alternate capability of the at least one second IoT node and an existing capability of the first IoT node based on at least one parameter associated with the first IoT node and the at least one second IoT node; and re-generating the smart contract to be executed based on the level of match.

5. The method of claim 4, further comprising:

notifying the at least one failed capability to the at least one second IoT node; and sending metadata associated with the at least one second IoT node with the at least one failed capability to a service provider.

6. The method of claim 4, wherein detecting that the at least one capability information corresponds to the at least one failed capability of the at least one second IoT node comprises:

executing a diagnostic script present in an existing smart contract with the at least one second IoT node; and detecting that the at least one capability information corresponds to the at least one failed capability of the at least one second IoT node based on the diagnostic script, wherein the diagnostic script is defined by at least one of a service provider and the user.

7. The method of claim 1, wherein the at least one parameter includes at least one of a type of communication between the first IoT node and the at least one second IoT node, a level of communication between the first IoT node and the at least one second IoT node, a computing power of the first IoT node, and a computing power of the at least one second IoT node.

8. The method of claim 1, wherein executing the smart contract with the at least one second IoT node comprises:

determining a sensitive data and a non-sensitive data in the smart contract;

splitting the smart contract into a first contract and a second contract, wherein the first contract comprises the sensitive data and the second contract comprises the non-sensitive data;

executing the first contract; and offloading the second contract to be executed by the first IoT node to at least one external entity.

9. The method of claim 1, wherein the generation of the smart contract is based on a smart contract generation policy.

10. The method of claim 9, wherein the smart contract generation policy is defined by at least one of a service provider and the user.

11. A first internet of things (IoT) node in a blockchain based on IoT network, the first IoT node comprising:

a memory;

a communicator comprising communication circuitry;

a processor coupled to the memory and the communicator, the processor configured to:

receive at least one capability information associated with at least one second IoT node from the block chain based IoT network;

generate a smart contract to be executed between the first IoT node and the at least one second IoT node based on the at least one capability information, and at least one parameter associated with the first IoT node and the at least one second IoT node;

execute the smart contract with the at least one second IoT node; and communicate via the communicator with the at least one second IoT node based on the smart contract, wherein to generate the smart contract, the processor is configured to:

determine whether capabilities of the first IoT node and the at least one second IoT node match;

based on a determination that the capabilities of the first IoT node and the at least one second IoT node do not match, determine whether a user manually want to match the capabilities of the first IoT node and the at least one second IoT node;

based on a determination that the user wants to match capabilities of the first IoT node and the at least one second IoT node, determine matched capabilities manually set by the user; and generate the smart contract between the first IoT node and the at least one second IoT node based on the matched capabilities manually set by the user.

12. The first IoT node of claim 11, wherein the processor is configured to generate the smart contract to be executed between the first IoT node and the at least one second IoT node comprises:

detect that the at least one capability information is a new capability of the at least one second IoT node, determine a level of match between the new capability of the at least one second IoT node and an existing capability of the first IoT node based on the at least one parameter associated with the first IoT node and the at least one second IoT node, and generate the smart contract to be executed based on the level of match.

13. The first IoT node of claim 11, wherein the processor is configured to generate the smart contract to be executed between the first IoT node and the at least one second IoT node comprises:

detect that the at least one capability information corresponds to a change in at least one existing capability of the at least one second IoT node, determine a level of match between the change in the at least one existing capability of the at least one second IoT node and the existing capability of the first IoT node based on the at least one parameter associated with the first IoT node and the at least one second IoT node, and generate the smart contract to be executed based on the level of match.

14. The first IoT node of claim 11, wherein the processor is configured to generate the smart contract to be executed between the first IoT node and the at least one second IoT node comprises:
   detect that the at least one capability information corresponds to at least one failed capability of the at least one second IoT node, determine at least one alternate capability for the at least one failed capability of the at least one second IoT node in the IoT network, determine a level of match between the at least one alternate capability of the at least one second IoT node and an existing capability of the first IoT node based on at least one parameter associated with the first IoT node and the at least one second IoT node; and
   re-generate the smart contract to be executed based on the level of match.

15. The first IoT node of claim 14, wherein the processor is further configured to:
   notify the at least one failed capability to the at least one second IoT node; and
   send metadata associated with the at least one second IoT node with the at least one failed capability to a service provider.

16. The first IoT node of claim 14, wherein the processor is configured to detect that the at least one capability information corresponds to the at least one failed capability of the at least one second IoT node comprises:
   execute a diagnostic script present in an existing smart contract with the at least one second IoT node, and detect that the at least one capability information corresponds to the at least one failed capability of the at least one second IoT node based on the execution of the diagnostic script, wherein the diagnostic script is defined by at least one of a service provider and the user.

17. The first IoT node of claim 11, wherein the at least one parameter includes at least one or a type of communication between the first IoT node and the at least one second IoT node, a level of communication between the first IoT node and the at least one second IoT node, a computing power of the first IoT node, and a computing power of the at least one second IoT node.

18. The first IoT node of claim 11, wherein the processor is configured to execute the smart contract with the at least one second IoT node comprises:
   determine a sensitive data and non-sensitive data in the smart contract;
   split the smart contract into a first contract and a second contract, wherein the first contract comprises the sensitive data and the second contract comprises the non-sensitive data;
   execute the first contract; and offload the second contract to be executed by the first IoT node to at least one external entity.

19. The first IoT node of claim 11, wherein the generation of the smart contract is based on a smart contract generation policy.

20. The first IoT node of claim 19, wherein the smart contract generation policy is defined by at least one of a service provider and the user.

* * * * *